US006164387A

United States Patent [19]
Chang

[11] Patent Number: 6,164,387
[45] Date of Patent: Dec. 26, 2000

[54] MULTISTAGE PUSH BUTTON FOR A PNEUMATIC TOOL

[76] Inventor: An-Mei Chang, 7F-10, No. 143, Bo-An Six Street, Tachung City, Taiwan

[21] Appl. No.: 09/542,834

[22] Filed: Apr. 4, 2000

[51] Int. Cl.[7] .................................................. B23B 45/04
[52] U.S. Cl. .................................................. 173/169
[58] Field of Search .................................. 173/168, 169, 173/170; 91/31, 461

[56] References Cited

U.S. PATENT DOCUMENTS

| | | | |
|---|---|---|---|
| 3,635,605 | 1/1972 | Hall et al. | 173/169 |
| 3,924,693 | 12/1975 | Whitehouse | 173/169 |
| 4,024,892 | 5/1977 | Prisco et al. | 91/31 |
| 4,776,561 | 10/1988 | Braunlich et al. | 91/461 |
| 5,303,781 | 4/1994 | Lin | 173/169 |
| 5,377,769 | 1/1995 | Hasuo et al. | 173/169 |
| 5,797,462 | 8/1998 | Rahm | 173/169 |

*Primary Examiner*—Scott A. Smith
*Attorney, Agent, or Firm*—Rosenberg, Klein & Lee

[57] ABSTRACT

A multistage push button for a pneumatic tool is provided to control the magnitude of air pressure introduced into the pneumatic tool at different stages. The push button includes a main rod movably mounted in a seat of the push button and having a diameter-reduced middle portion and an inclined shoulder portion behind the middle portion. The seat has at least a press spring set therein to normally push a steel ball into the seat. When the main rod is pushed inward with the inclined shoulder portion contacting with the steel ball, an innermost section of the main rod having a larger outer diameter is moved out of the seat to admit a smaller amount of air into the pneumatic tool. And when the inclined shoulder portion pushes the steel ball radially outward, a next inner section of the main rod having a smaller outer diameter is moved out of the seat to admit more air into the pneumatic tool.

2 Claims, 6 Drawing Sheets

MULTISTAGE PUSH BUTTON FOR A PNEUMATIC TOOL

BACKGROUND OF THE INVENTION

The operation of a pneumatic tool is controlled through a push button mounted on the tool. When the push button is depressed, a volume of high-pressure air is introduced into the pneumatic tool to rotate a front working end of the tool, so that works such as tightening or loosening screws that are otherwise usually done manually could now be more efficiently completed.

FIG. 1 is a sectional view of a conventional push button A2 that is designed for mounting on a common pneumatic tool A as schematically shown in FIG. 3. When a main rod A3 of the push button A2 is pushed inward, an amount of high-pressure air supplied via an air hose A1 (see FIG. 3) is quickly introduced into the pneumatic tool A to drive a working element of the tool to work. The operating speed of the working element of the pneumatic tool A completely depends on the air pressure introduced into the tool A. The tool A operates quicker when a higher air pressure is introduced thereinto, and slower when a lower air pressure is introduced. To control the air pressure to be introduced into the tool A, an operator must control the strength of depressing the push button A2 completely according to his own experience or physical feel. It is therefore uneasy for all operators to apply force accurately and uniformly on the push button to obtain a desired operating speed of the pneumatic tool A, particularly when the operator has handled the pneumatic tool A having a considerable weight for a prolonged time and got sore and ached fingers holding the tool A.

SUMMARY OF THE INVENTION

It is therefore a primary object of the present invention to provide a multistage push button for a pneumatic tool, with which an operator can easily apply force in two or more stages to introduce desired magnitudes of air pressure for driving the pneumatic tool to rotate at different and controlled speeds.

To achieve the above and other objects, the multistage push button of the present invention mainly includes a main rod movably mounted in a seat of the push button and having a diameter-reduced middle portion and an inclined shoulder portion behind the middle portion. The seat has at least a press spring set therein to normally push a steel ball into the seat. When the main rod is pushed inward with the inclined shoulder portion contacting with the steel ball, an innermost section of the main rod having a larger outer diameter is moved out of the seat to admit a smaller amount of air into the pneumatic tool. And when the inclined shoulder portion pushes the steel ball radially outward, a next inner section of the main rod having a smaller outer diameter is further moved out of the seat to admit more air into the pneumatic tool.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
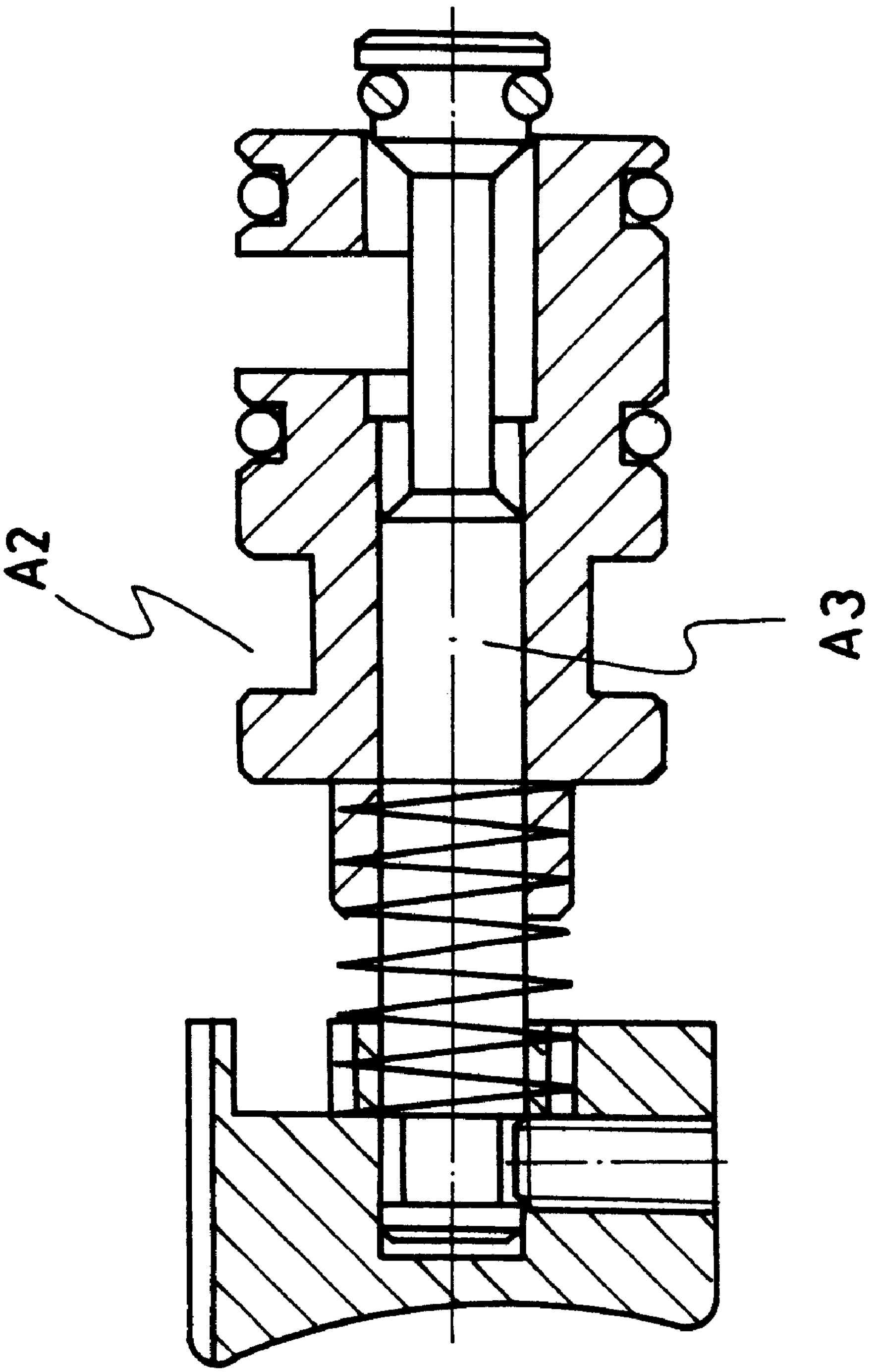
FIG. 1 is a sectional view of a conventional push button for a pneumatic tool.
Figure 2:
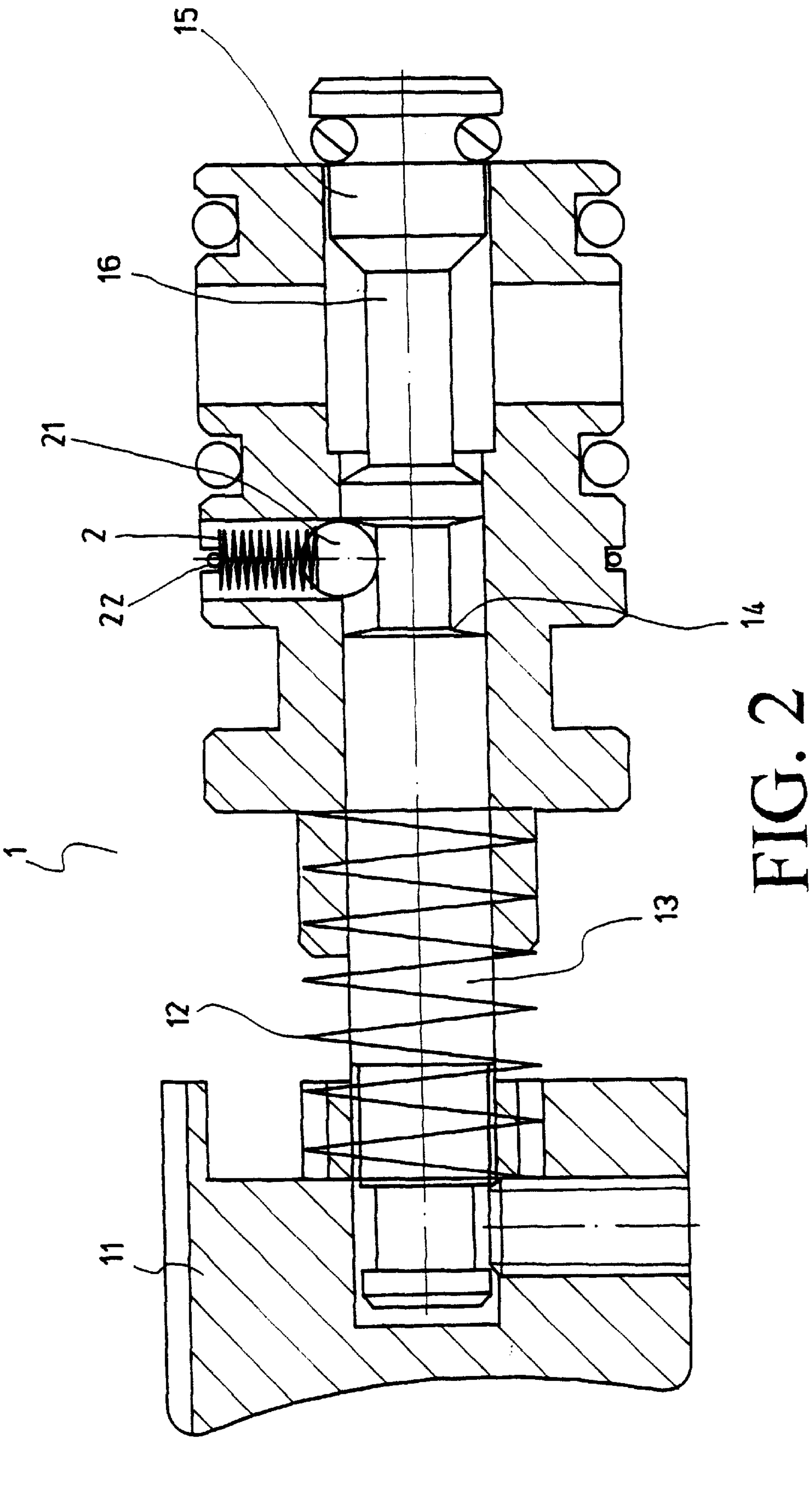
FIG. 2 is an enlarged sectional view of a two-stage push button for a pneumatic tool according to an embodiment of the present invention.
Figure 3:
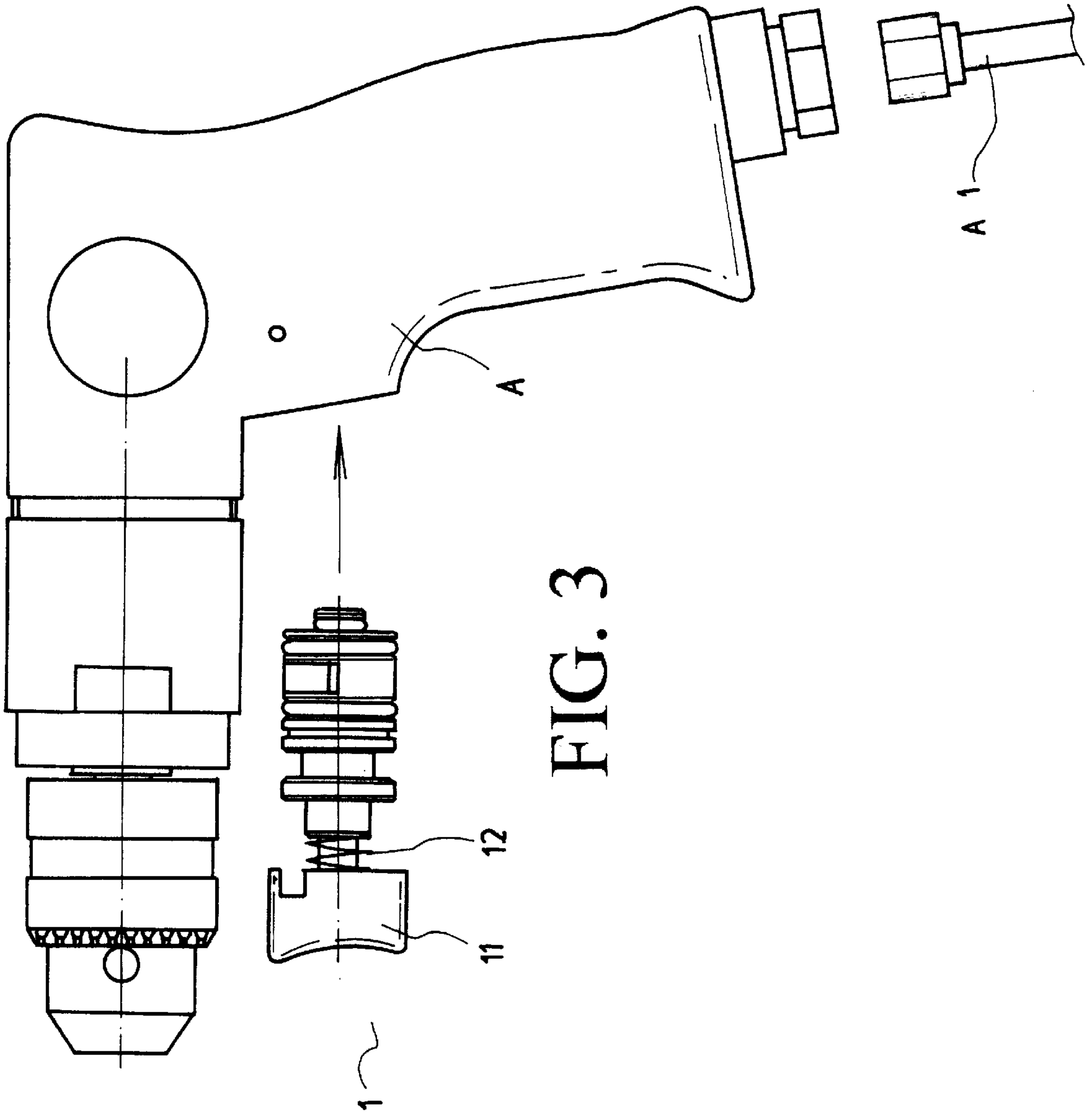
FIG. 3 is a side view showing the association of the two-stage push button of FIG. 2 with a pneumatic tool.

The present invention relates to a multistage push button for a pneumatic tool. In FIG. 2, a two-stage push button is shown as an example based on which the present invention will be described herein. The two-stage push button, as shown in FIG. 3, is designed for mounting in a pneumatic tool A, and mainly includes, as shown in FIG. 2, a seat 1 and a press spring 2.

A main rod 13 is movably mounted in an axially extended passage of the seat 1 with a button head 11 connected to an outer end of the main rod 13 and a spring 12 put around an outer portion of the main rod 13 between the seat 1 and the button head 11. The main rod 13 has a diameter-reduced middle portion, such that an inclined shoulder portion 14 is formed between the outer portion and the diameter-reduced middle portion. An inner portion of the main rod 13 is divided into a first inner section 15 and a second inner section 16 that is located between the first inner section 15 and the middle portion and has a reduced diameter.

The press spring 2 is mounted in a cavity provided on a wall of the seat 1 at a predetermined position with a steel ball 21 disposed at an inner end of the press spring 2. The press spring 2 and the steel ball 21 are held in the cavity on the seat by a retaining ring 22 put around the seat outside the cavity. When the button head 11 is not pushed toward the seat 1, the steel ball 21 is normally pushed radially inward by the press spring 2 to partially project into the axial passage of the seat 1 and contact with the diameter-reduced middle portion of the main rod 13, as shown in FIG. 2.

Figure 4:
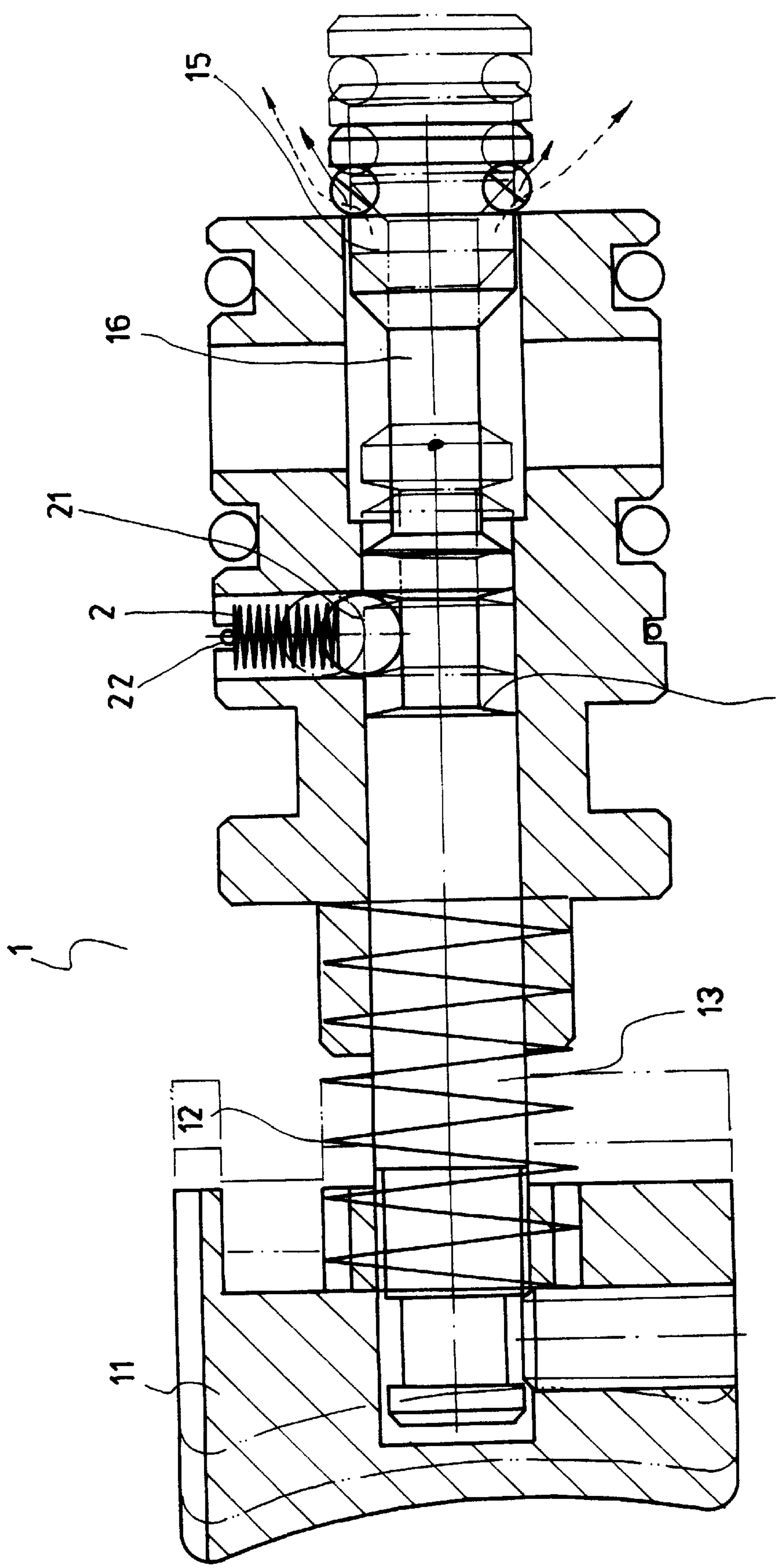
FIG. 4 illustrates the process of operating the two-stage push button of FIG. 2.

Please now refer to FIG. 4. When the two-stage push button of the present invention is pushed at the button head 11, the main rod 13 is caused to move inward relative to the seat 1. When the main rod 13 is moved inward to such an extent that the inclined shoulder portion 14 contacts with the steel ball 21, the first inner section 15 of the main rod 13 is moved to partially project from an inner end of the seat 1. At this point, a small amount of compressed air in the axial passage of the seat 1 is released from the seat 1 as indicated by phantom arrows in FIG. 4. It is to be noted that the compressed air released at this stage is not all the air in the seat 1. With this initial small amount of compressed air released from the seat 1, the pneumatic tool A is caused to operate and produce a somewhat slower rotation at its front working end. This is the first stage of air-actuated operation of the pneumatic tool A.

When the button head 11 is further pushed toward the seat 1 with an increased force such that the inclined shoulder portion 14 of the main rod 13 radially pushes the steel ball 21 fully out of the axial passage of the seat 1, the first inner section 15 is completely moved out of the inner end of the seat 1. Since the second inner section 16 has a reduced diameter, its position in the seat 1 at this point would allow the air remained in the seat 1 to fully release via the inner end of the seat 1. An amount of air released from the seat 1 at this point is larger than that released at the first stage and therefore causes the front working end of the pneumatic tool A to rotate quicker. This is the second stage of air-actuated operation of the pneumatic tool A.

In brief, the push button for a pneumatic tool according to the above-described embodiment of the present invention is superior to the conventional push button for a pneumatic tool because its main rod 13 includes an inclined shoulder portion 14 that contacts with the steel ball 21 to allow a small amount of compressed air to be released from the seat 1 into the pneumatic tool A.

Figure 5:
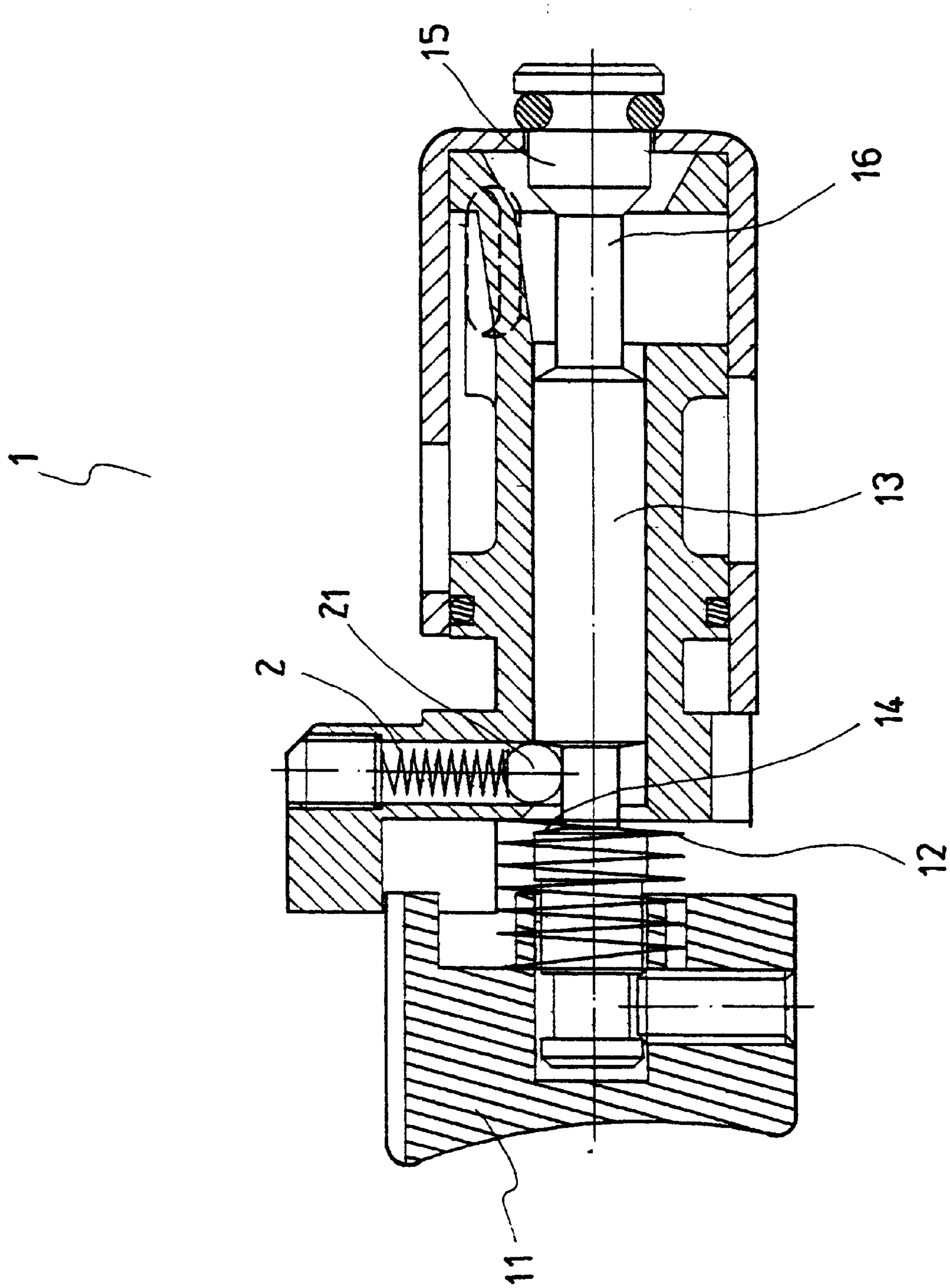
FIG. 5 shows the two-stage push button of the present invention is implemented in the form of a forward-reverse switch.
Figure 6:
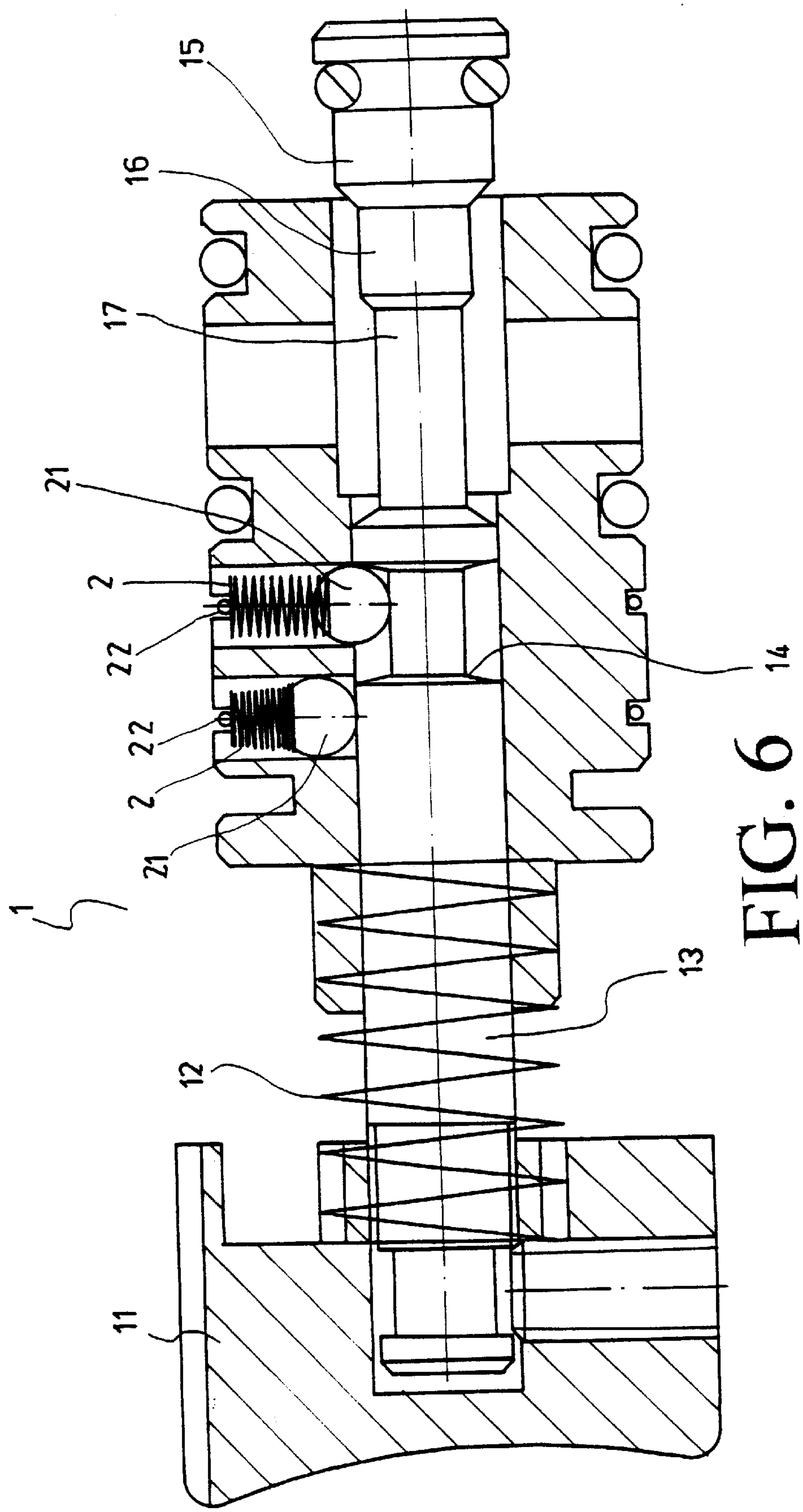
FIG. 6 is an enlarged sectional view of a three-stage push button for a pneumatic tool according to another embodiment of the present invention.

The above-described two-stage push button for a pneumatic tool according to the present invention may also be implemented in the form of a forward-reverse switch, as shown in FIG. 5. The two-stage push button for pneumatic tools of FIG. 5 is structurally similar to that of FIG. 2 and includes a seat 1', a button head 11', a spring 12', a main rod 13', an inclined shoulder portion 14', a first inner section 15', a second inner section 16', a press spring 2', and a steel ball 21'. Since the forward-reverse switch is a well-known conventional structure, it is not repeatedly described herein. Please refer to FIG. 6. The two-stage push button of FIG. 2 may be modified to include two sets of press spring 2 and steel ball 21 being separately retained in place on the seat 1 by two retaining rings 22 and a main rod 13 having an inner portion divided into a first inner section 15, a second inner section 16, and a third inner section 17 without changing other basic structure of the push button of FIG. 2. This modification made to the push button of FIG. 2 allows the air in the seat 1 to be easily released into the pneumatic tool A in three stages to drive the pneumatic tool A to rotate at three different speeds.

What is claimed is:

1. A multistage push button for a pneumatic tool, comprising a seat mounted in said pneumatic tool at a predetermined position, a main rod movably mounted in an axial passage in said seat, a button head connected to an outer end of said main rod, and a spring put around and connected to said main rod between said seat and said button head; said multistage push button being characterized in that said main rod includes a diameter-reduced middle portion and an inclined shoulder portion immediately behind said diameter-reduced middle portion, and an inner portion divided into at least two sections having different outer diameters, and that said seat is provided on a wall thereof at one or more predetermined positions with at least one cavity into which a steel ball and a press spring behind the steel ball are mounted, such that said steel ball is normally pushed by said press spring to elastically project into said axial passage of said seat to contact with said diameter-reduced middle portion of said main rod when there is not any push force applied on said main rod; whereby when a push force is applied on said button head to move in said main rod, said inclined shoulder portion is first brought to contact with said steel ball and an innermost one of said at least two inner sections of said main rod is moved to project from an inner end of said seat to admit a smaller amount of air inside said seat into said pneumatic tool, and when a further push force is applied on said button head, said inclined shoulder portion is brought to radially push said steel ball out of said axial passage of said set and a next one of said at least two inner sections of said main rod is moved to project from the inner end of said seat to admit a larger amount of air into said pneumatic tool.

2. A multistage push button for a pneumatic tool as claimed in claim 1, wherein any one of said at least two inner sections has an outer diameter larger than that of another one of said at least two inner sections located behind it.

* * * * *